Patented Aug. 11, 1942

2,292,441

UNITED STATES PATENT OFFICE 2,292,441

PRODUCTION OF TEXTILE OR SIMILAR SHEET MATERIALS

Bernard James Habgood, Maldwyn Jones, and Walter Fairbairn Smith, Blackley, Manchester, England, assignors to Imperial Chemical Industries Limited, a corporation of Great Britain No Drawing. Application June 20, 1940, Serial No. 341,588. In Great Britain June 22, 1939

2 Claims. (Cl. 117—161)

This invention relates to improvements in the production of coated and/or impregnated textile and similar sheet material in which the coating and/or impregnating material consists mainly of the ethylene polymer referred to below.

The ethylene polymers used for the purpose of this invention are solid polymers of ethylene of high molecular weight, which do not soften or melt below about 100° C., and which may be obtained by polymerising ethylene, with or without a very small proportion of oxygen under high pressure at raised temperature as described for example, in British Patent No. 471,590, and in United States Patent 2,153,553. These polymers correspond in composition substantially to $(CH_2)_x$ and show by X-ray diffraction analysis a crystalline structure. These ethylene polymers, which are referred to hereinafter as polythene, have properties useful in textile coating and impregnating compositions. Thus they are resistant to acids and alkalies and most chemical compounds. They are also resistant to the swelling action of oils and solvents, at or near room temperature, their dielectric strength is high and they are colourless and translucent.

In British Patent No. 491,804 the application of these and other related polymers in the manufacture of coated and/or impregnated paper fabric and other materials is described. The modes of application there mentioned include applications from solution, the use of preformed polythene sheet or film and application as powder.

This invention relates to application by the calendering process.

The calendering process is one which is much used in making coated sheet material especially textile material. Polythenes themselves we find are not well suited for the calendering process because in order to make them soft enough to work it is necessary to heat them almost to their melting points, and then a slight rise in temperature will cause melting or partial melting and a slight drop will cause hardening or powdering of the polythene. As temperature is difficult to control accurately in calendering, coating with pure polythenes is attended with difficulty.

We have found that this difficulty may be overcome by incorporating with the polythene, before calendering, a minor proportion of natural rubber or synthetic rubber-like material at least sufficient in quantity to yield a mixture which remains plastic, without melting, over a range of temperatures convenient for calendering. Among synthetic rubber-like materials referred to herein generally as rubber we include not only the products obtained by the polymerisation of butadiene-1:3,2-chlorobutadiene-1:3 or their homologues or by the interpolymerisation of the said compounds with other polymerisable substances, such as, for example, certain derivatives of acrylic acid, but also those rubber-like products of especially high resistance to oils and solvents which are obtained by the treatment of certain halogen-containing aliphatic compounds, namely, glycerol $\alpha\gamma$-dichlorohydrin, with inorganic polysulphides and products having rubber-like properties obtained by polymerising isobutylene.

We find that natural rubber and the above synthetic rubber-like materials can be readily incorporated into polythenes, for instance by milling, and that by the use of only small percentages, for instance 5%, products are obtained which may be readily applied on calenders, but otherwise retain the properties of the polythenes, substantially unaltered.

The proportions of the material to be incorporated depend to some extent on the material chosen, the method of application and other circumstances, but in general satisfactory results are obtainable by the use of 5–30% calculated on the weight of the polythene. Two or more of the materials may be incorporated together if desired. Fillers and other ingredients for coatings may be incorporated in the mixes before calendering.

The incorporation of the natural rubber or other material into the polythene may be conveniently effected on a rubber roller mill. The application of the polythene to the fabric is effected by means of a calender or other roller machine using heated rollers. For some coatings it is sufficient to pass the cloth or other material to be coated once through one nip of a calender to obtain a material with a finished coating. For other coatings or impregnations the cloth may be given, after the calendering operation, a passage over heated rollers to effect greater adherence or impregnation. Alternatively, the material may, after coating, be hung up in heated chambers or stoves, or otherwise submitted to a raised temperature. In general the details of the calendering follow the customary technique.

Working as above it is possible to obtain without difficulty, textile fabrics or other similar sheet material with strong adherent coatings of different thicknesses and with partial or complete impregnation of the material.

The principal textile materials, which may be employed, are cotton, woollen and silk materials. The silk may be natural or artificial, e. g., regenerated cellulose. Other sheet materials such as paper, leather or even material containing or consisting of a woven metal mesh may be used provided that their physical consistency is such that some adherence to or penetration of the surface layers is possible and provided that the flexibility and other physical properties are such as to permit the necessary coating treatment.

The known chemical inertness of polythenes makes them attractive coating materials for chemical plant, but difficulties may be met with in bonding the polythenes to the material of which the plant is constructed. By using polythene coated fabrics, the fabric backing permits great latitude in methods of bonding to a variety of surfaces. Other possible applications are in the fabrication of artificial leathercloths, and as doubling materials for fabrics. The excellent electrical characteristics of polythene also make the use of polythene covered fabrics of value in electrical construction, e. g., as insulating tape, as a component of electrical condensers.

Our invention consists of a process for the production of textile or similar sheet material coated and/or impregnated with polythene compositions which comprises calendering on the said material, a heated plastic mixture of a polythene and a minor proportion of natural rubber or a synthetic rubber-like material, at least sufficient to yield a mixture which remains plastic without melting over a range of temperatures convenient for calendering. The said process may also include a subsequent heat treatment.

The invention also includes textile and similar sheet material impregnated with the said polythene compositions.

The following examples, in which parts are by weight, illustrate but do not limit the invention.

*Example 1*

The following mixing was made on a rubber mixing mill:

| | Parts |
|---|---|
| Polythene A (i. e., polythene of molecular weight of 15,000 to 20,000) | 75 |
| Plastic condensation product made by treating glycerol αγ-dichlorhydrin with polysulphide as described in specification No. 453,850 | 25 |
| Natural rubber | 5 |

This mixture was spread on to woven cotton cloth by means of a calender with heated rollers by the ordinary technique, the cloth however being passed over a heated surface before coming into contact with the spreading composition. A uniformly coated sheet is obtained. The coating had, however, only poor adherence. The coated material was allowed to remain for 15 minutes at 120° C. The resulting material had a uniform well-adhering coating of good mechanical properties. The textile material is partly impregnated. It may be brought into contact with boiling water with little or no harmful effect. It is suitable for material resistant to vesicant liquid.

*Example 2*

The following mixture was made up as in Example 1:

| | Parts |
|---|---|
| Polythene A | 75 |
| Plastic condensation product made by treating glycerol αγ-dichlorhydrin with polysulphide as described in specification No. 453,850 | 25 |
| Neoprene, type E (i. e., the polymerised 2-chlorobutadiene-1:3 sold under this designation) | 5 |

This mixture was calendered on to heated textile fabric, the temperature of the calender bowls being as follows: top bowl, 95° C., middle, 102° C., bottom 95° C. Calendering was effected readily. The calendered material was given a heat treatment at 120° C. A coating was obtained similar to the of Example 1.

*Example 3*

The following mixture was made as before:

| | Parts |
|---|---|
| Polythene A | 100 |
| Natural rubber | 10 |

This mixture was calendered on to heated fabric and the fabric then given a heat treatment at 120° C. A coating having good adhesion and other mechanical properties was obtained. The textile material is partly impregnated.

*Example 4*

The following mixture was made as before:

| | Parts |
|---|---|
| Polythene A | 100 |
| Neoprene, type E | 5 |

This mixture was then calendered on to heated fabric, the temperature of the calender bowls being as follows: top bowl, 80° C., middle 105–110° C., bottom, 80° C. Calendering took place very readily, a smooth coating being obtained with fairly good adhesion and tensile strength. The coating is improved by a heat treatment at 120° C.

Polythene coated fabric prepared by the above process has been tested as a petrol resistant diaphragm in chemically and mechanically operated petrol pumps and has given excellent results.

*Example 5*

The following mix was made as before:

| | Parts |
|---|---|
| Polythene A | 100 |
| Polymerised isobutylene (average molecular weight about 100,000) | 5 |

This mixing was calendered on to heated fabric using the following temperatures: top bowl, 80° C., middle bowl, 107–112° C., bottom bowl 85° C. Calendering took place easily and a smooth coating was obtained with fairly good adhesion, which was further improved by heating to 120° C.

*Example 6*

A similar mix to that given in Example 5 was made using a polymerised isobutylene having an average molecular weight of about 200,000. The same technique and conditions were employed and similar coated fabrics were obtained.

We claimed:
1. A process for producing coated fabric sheet material which comprises calendering on a flexible fabric sheet a heated plastic mixture which comprises a polymer of ethylene and from 5% to

30%, based on the weight of the ethylene polymer of a synthetic rubber which remains plastic without melting during the calendering, said synthetic rubber being the condensation product of glyceral $\alpha\gamma$-dichlorohydrin with inorganic polysulfide, said polymer of ethylene corresponding in composition substantially to $(CH_2)_x$ and showing by X-ray diffraction analysis a crystalline structure.

2. A coated fabric sheet material comprising flexible fabric sheet material carrying an adherent coating comprising essentially a mixture of a polymer of ethylene and from 5% to 30%, based on the weight of the ethylene polymer, a synthetic rubber comprising the condensation product of glycerol $\alpha\gamma$-dichlorohydrin with inorganic polysulfide, said polymer of ethylene corresponding in composition substantially to $(CH_2)_x$ and showing by X-ray diffraction analysis a crystalline structure.

BERNARD JAMES HABGOOD.
MALDWYN JONES.
WALTER FAIRBAIRN SMITH.